Oct. 24, 1939.   A. D. NASH   2,177,000
PROCESS FOR MAKING A COATED GLASS SHEET
Filed July 17, 1936    2 Sheets-Sheet 1
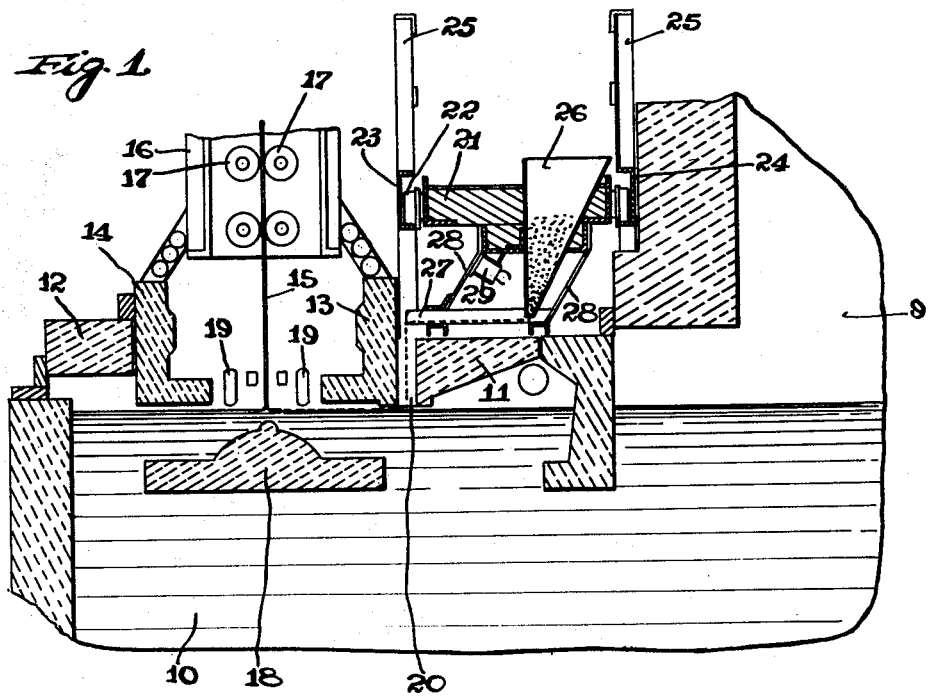
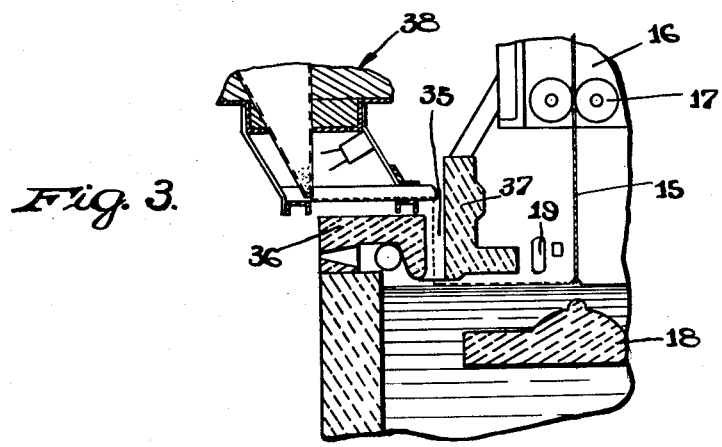
INVENTOR
ARTHUR D. NASH
BY
Bundley & Bee
ATTORNEYS.

Oct. 24, 1939.    A. D. NASH    2,177,000
PROCESS FOR MAKING A COATED GLASS SHEET
Filed July 17, 1936    2 Sheets-Sheet 2
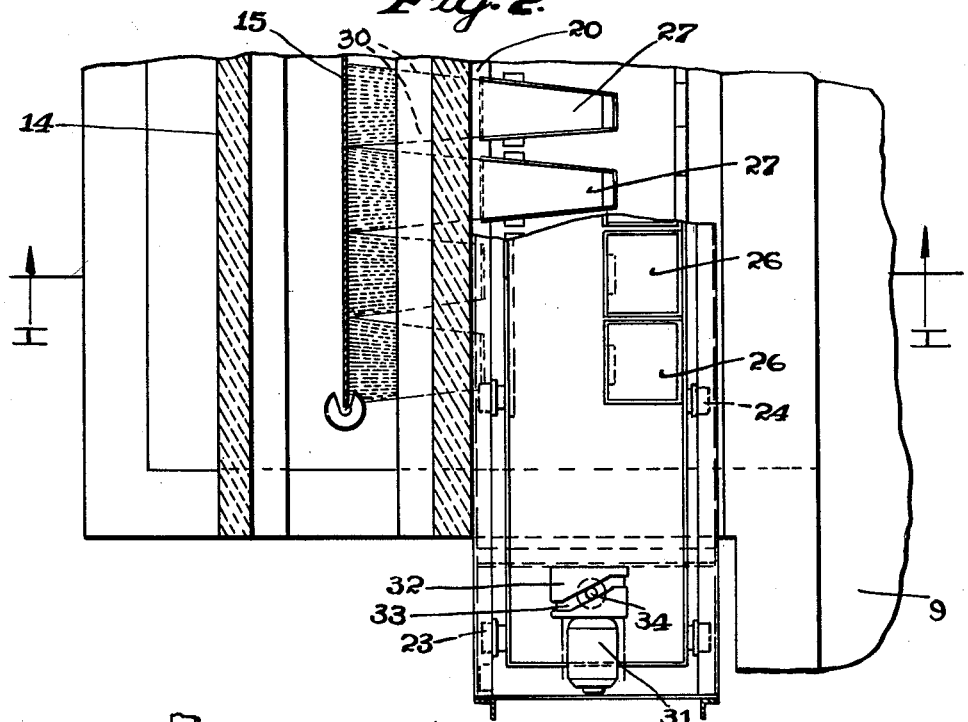
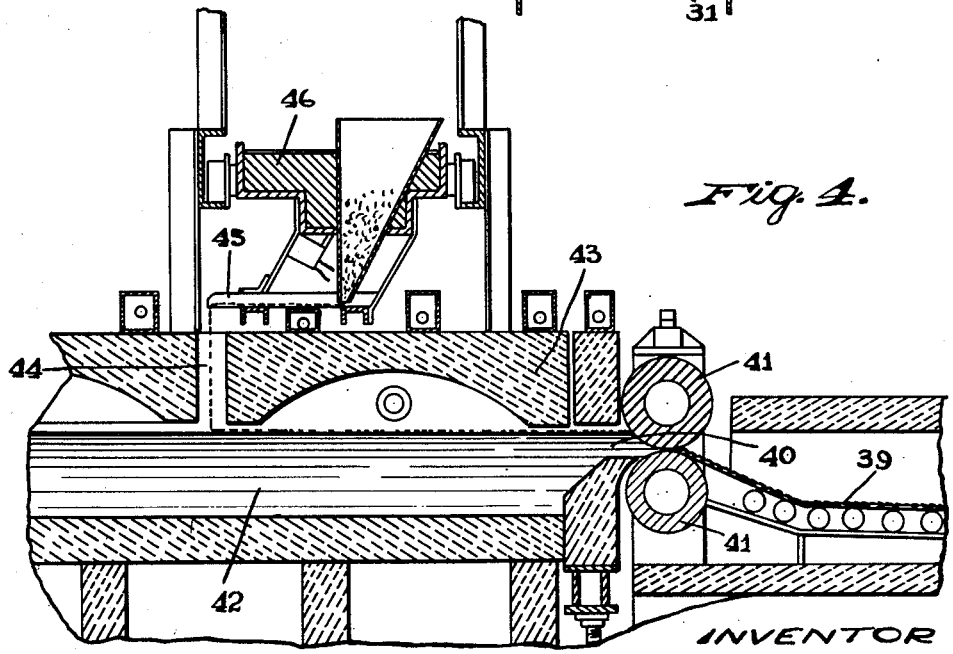
INVENTOR
ARTHUR D. NASH
BY Bradley & Bee
ATTORNEYS.

Patented Oct. 24, 1939

2,177,000

UNITED STATES PATENT OFFICE 2,177,000

PROCESS FOR MAKING A COATED GLASS SHEET

Arthur D. Nash, Sewickley, Pa., assignor to Pittsburgh Plate Glass Company, a corporation of Pennsylvania Application July 17, 1936, Serial No. 91,067

3 Claims. (Cl. 49—83.1)

The invention relates to a process of making a glass sheet by a continuous operation and more particularly a glass sheet from a molten bath of clear glass and providing it with a vitreous coloring material which will in most cases form one of the surface layers of the sheet, although the coloring material may be mixed through the body of the sheet or may be applied so as to give a colored film or layer on both sides of the sheet. The invention has for its principal objects the provision of an improved process which may be practiced to produce colored sheet glass at a very low cost and of a high quality as compared with processes heretofore used in which colored glazes are applied to clear glass sheets after such sheets have been fabricated in the usual way. Another object is the provision of a process which permits the use of colored glazes having a melting point approximating that of standard plate and window glass, so that the glaze has the same resistance to weathering as the clear glass. A further object is the provision of a process which can be applied in connection with usual apparatus required in the production of plate and window glass, and in which a shift from one color to another and from a clear to a colored product may be made at any time without wastage and without interrupting the operation, thus permitting the one apparatus to produce any type of glass which may be required, and only in the quantity required. A still further object is the provision of a process permitting the production of unusual color effects and combinations of colors in wide variety, as will be readily understood from the description following and the apparatus illustrated in the accompanying drawings for carrying out the process, wherein:

Figure 1 is a vertical section through one form of the apparatus on the line I—I of Fig. 2. Fig. 2 is a partial plan view. And Figs. 3 and 4 are vertical sections through modifications.

Referring to the apparatus shown in Figs. 1 and 2, the reference numeral 9 indicates the outlet end of a glass melting tank, and 10 is a forehearth or extension connected to the melting tank. The forehearth is in part covered by the refractory members 11 and 12 and the L-blocks 13 and 14, the latter being separated to provide a space for the drawing of the glass sheet 15. This sheet is drawn up continuously through a Fourcault leer 16 provided with the driven rolls 17 which grip the sides of the sheets. Beneath the line of draw of the glass sheet is the draw bar 18 and on either side of the glass sheet are the coolers 19, 19. The structure as thus far described is well known in the art and is used for the continuous product of window glass.

Located to the rear of the block 13 between such block and the cover member 11 is a slot 20 extending across the width of the forehearth, and in carrying out the process to which the present invention relates, a colored glazing material is fed continuously onto the molten bath where it floats and is carried forward by the movement of the surface glass until it becomes incorporated as the surface layer of the sheet 15. Contrary to what might be expected, this coloring matter remains in the surface layer of glass and does not become noticeably dissipated throughout the main body of glass in the forehearth 10, so that after any desired period of colored glass production, the feed of coloring material may be discontinued and the production may be shifted to ordinary uncolored window glass, or the feed to the bath of another color glaze may be substituted. The coloring matter in this instance is preferably a granular colored glass which has about the same coefficient of expansion and melting point as the glass of the main bath. Such high melting glass has practically the same melting qualities as window glass, so that the colored layer of glass as produced by the present process has a surface durability much in excess of that present in glasses which are glazed on one side by processes well known in the art employing an enamel having a low melting point. The glazing material may vary in size and is preferably not a powder or dust, as such powder or dust is objectionable due to its dissipation into the atmosphere above the tank, which in the course of time produces a discoloration of the main body of glass. The coloring agent may also consist of ordinary glass frit mixed with coloring material.

Suitable means are illustrated above the cover 11 for giving a uniform measured feed of the coloring material. This feeder apparatus is carried by a platform 21 provided with wheels 22 running upon the flanges of the channels 23 and 24, such channels being in turn supported upon the upright superstructure members 25. This platform carries a series of hoppers 26, each holding a body of the glazing material. These hoppers discharge to a plurality of troughs 27 placed side by side, as indicated in Fig. 2, such troughs increasing in width from their rear to their front ends. The troughs are supported upon the strips or plates 28 of spring material, and one of these plates carries an electrically operated vibrator 29. Under the influence of this vibrator, the material discharged into the troughs 27 at the bottoms of the hoppers is fed along the bottoms of such troughs in uniform layers and discharges through the slot 20. Feeders of this kind are well known in other arts, and may be regulated to give any desired volume of feed depending upon the operation of the vibrator and upon the amount of discharge permitted from the hopper to the trough. The discharge from each trough spreads out, as indicated by the dotted lines 30 in Fig. 2, as the glass moves forward so that by the time the colored material reaches the meniscus of the sheet 15, the entire area which is drawn into the sheet is covered by the glaze. The thickness of this glaze will depend upon the character of the coloring material and the quantity which is fed onto the surface of the glass.

In order to still further insure a uniform distribution of the coloring material from the various troughs 27, the platform 21 is provided with means shown in Fig. 2 for moving it back and forth during the feeding operation. This means comprises a motor 31 supported on the superstructure above the level of the platform and carrying upon its shaft a cam 32 provided with a slot 33. This slot is engaged by a cam roller 34 secured to the platform, so that the rotation of the cam by the motor reciprocates the platform back and forth longitudinally of the slot 20, thus giving a uniform distribution of the coloring material over the surface of the bath.

Fig. 3 illustrates a modification, in which the feed of colored glazing material is supplied through a slot 35 between the cover member 36 and the L-block 37, the construction in other respects following that of Fig. 1. The feed in this case is to the side of the sheet away from the melting tank, instead of to the side adjacent the melting tank as in the case of Fig. 1. The feeder 38 in this case is similar to that heretofore described in connection with Fig. 1. It will be understood in this connection, that if desired, the coloring material may be fed to the surface of the glass on both sides of the line of draw and in some cases, it may be desirable to produce glass of this character. Ordinarily, however, it is sufficient for most purposes to produce glass having a colored layer or film on one side only. Such glass may be used to advantage in many ways, such as for glass roofing, shingles, table tops, or for paneling in rooms or in connection with partitions.

Fig. 4 illustrates another modification, in which the process is applied to the manufacture of plate glass by the so-called Gelstharp process. Here a glass sheet 39 is fed continuously from a slot 40 and between a pair of water cooled sizing rolls 41, 41, the glass being subsequently carried through a horizontal leer. The forehearth 42 is, in this case, connected at its left hand end to a suitable glass melting tank and is provided with a cover 43 having a slot 44 through which colored glazing material is supplied. Such material is fed from a trough 45, or a series of troughs similar to those described in connection with the apparatus of Figs. 1 and 2, the feeding devices being carried upon the movable platform 46 as heretofore described. With this apparatus, as with the one heretofore described, the production of a sheet having a colored surface may be discontinued at any time and some other color substituted or the production may revert to ordinary plate glass, thus making the apparatus an all-purpose one and avoiding waste in shifting from one glass to another.

I am aware that it has been proposed, heretofore, to supply the surface of a glass bath with molten colored glass from an auxiliary tank which glass spreads over the surface of the bath from which a sheet is drawn to produce a sheet of clear glass having a colored layer or film on one side, but the method herein presents substantial advantages over such prior method. One advantage lies in the kind of equipment required in the present process as compared with that employing the auxiliary tank. A feeder for divided solid material is much less expensive and less difficult to control than an auxiliary melting tank. The primary advantage, however, lies in the character of the colored layer produced on the drawn sheet and the reduced tendency to diffuse the colored glass through the large body of clear glass in the forehearth. Molten glass applied to the surface of a bath tends to spread out in a very thin film and become diffused through the bath, because of its low viscosity, so that the colors produced on the drawn sheet are very thin and transparent. When applied in solid divided form, as here proposed, a thicker less transparent coat of the colored glass is possible, and it is even practicable by regulating the point of application of the divided material and its composition and degree of fineness, to produce a sheet with a coating layer which has a somewhat roughened surface to give an art glass for special uses. In such cases, the solid vitreous material does not become fully fused until it approaches the meniscus of the sheet and any tendency of the coating material to be diffused to those portions of the bath in which it would be objectionable is correspondingly reduced.

What I claim is:

1. A method of making a glass sheet which consists in withdrawing a sheet continuously from a molten bath of clear glass in such manner that the surface glass in the bath moves forwardly relative to the body of the bath as the sheet is formed, and applying continuously to such surface a layer of unfused vitreous glazing material which is fused on the surface of the bath and remains thereon and forms the surface layer of one side of the sheet.

2. A method of making a glass sheet which consists in withdrawing a sheet continuously from a molten bath of clear glass in such manner that the surface glass in the bath moves forwardly relative to the body of the bath as the sheet is formed, and applying continuously to such surface a layer of unfused vitreous glazing material which is fused on the surface of the bath and remains thereon and forms the surface layer of one side of the sheet, said glazing material being colored and of less specific gravity than the glass of the bath to prevent its diffusion downwardly therethrough.

3. A method of making a glass sheet which consists in drawing a sheet vertically from the surface of a molten bath of clear glass in which the surface glass moves forwardly and becomes incorporated into the sheet and applying to the surface of the bath on one side of the line of draw a body of unfused colored glazing material which fuses on the surface of the bath and remains thereon until it reaches the line of draw and is incorporated into the sheet as an integral portion thereof.

ARTHUR D. NASH.